April 18, 1939.  N. P. DARASH  2,154,496
TOOL HOLDER
Filed March 31, 1938  2 Sheets-Sheet 2
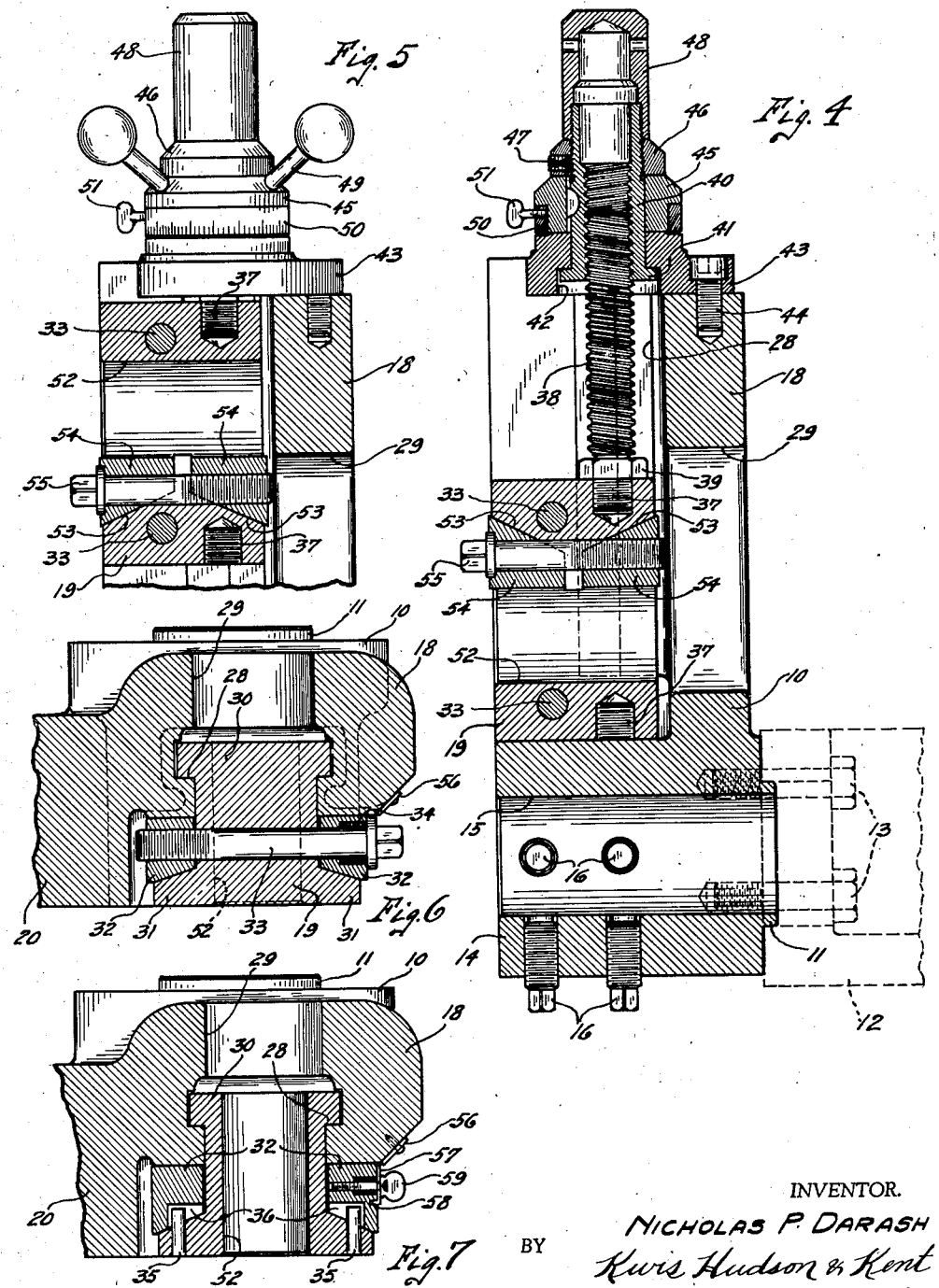
INVENTOR.
NICHOLAS P. DARASH
BY Kwis Hudson & Kent
ATTORNEYS Patented Apr. 18, 1939

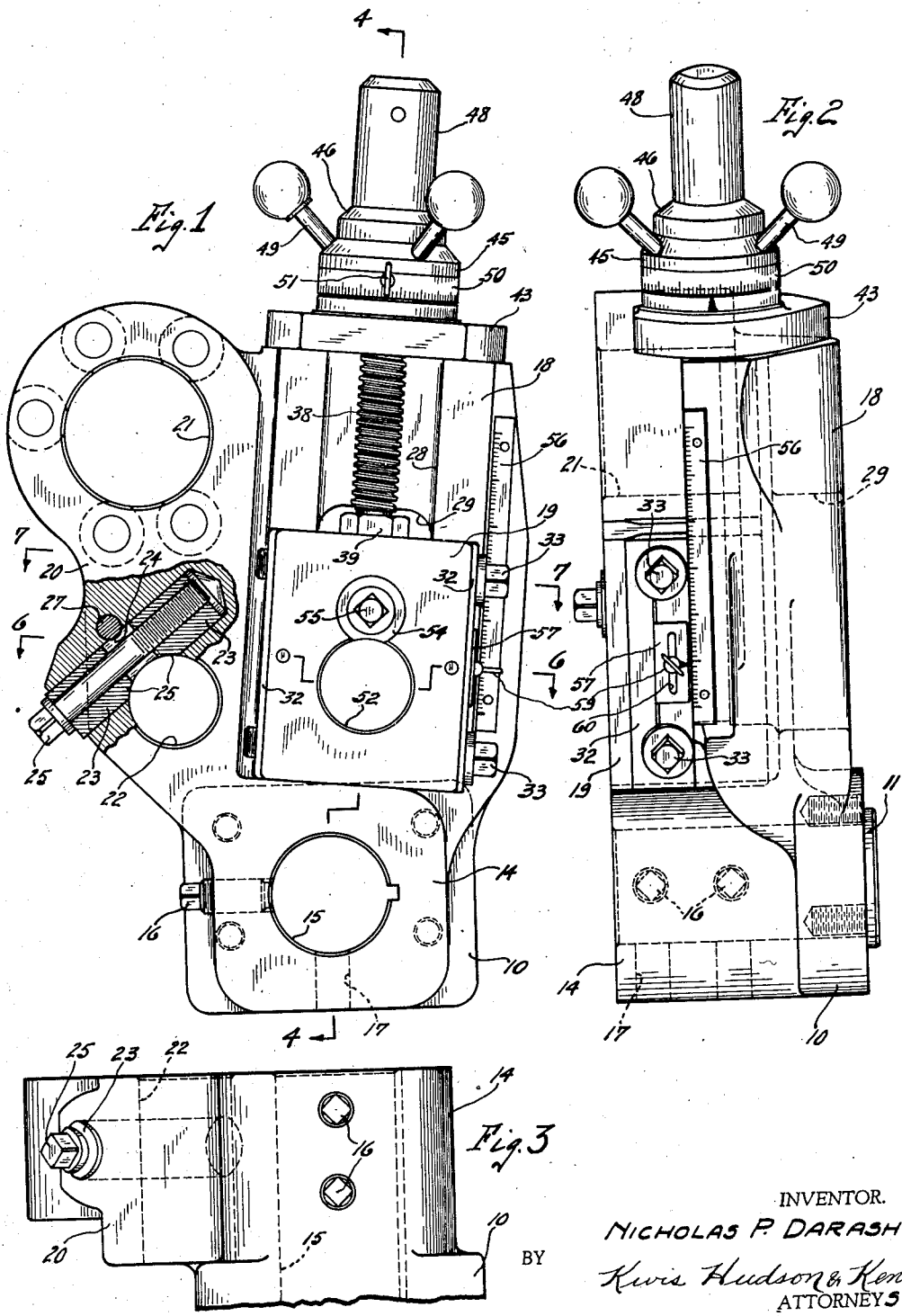

2,154,496

UNITED STATES PATENT OFFICE 2,154,496

TOOL HOLDER

Nicholas P. Darash, Cleveland, Ohio, assignor to The Warner & Swasey Company, Cleveland, Ohio, a corporation of Ohio Application March 31, 1938, Serial No. 199,173

14 Claims. (Cl. 29—57)

This invention relates to a tool holder for use with a machine tool.

An object of the invention is to provide a tool holder which is so constructed that tools and other tool holders can be secured therein and conveniently adjusted relative to the work.

Another object is to provide a tool holder which is so constructed that tools mounted and secured therein will have stability and steadiness.

Another object is to provide a tool holder having a tool supporting member which can be reversibly positioned on the tool holder, thus increasing the range of adjusted positions in which the tools carried by said member can be located.

A further object is to provide in a tool holder improved means for rigidly clamping the tools in adjusted position and also improved means for rigidly clamping together the relatively movable or adjustable parts of the tool holder.

A still further object is to provide a tool holder which, in addition to having fixed or rigid tool holding portions is also provided with an adjustable or movable tool holding portion.

Further and additional objects and advantages not hereinbefore specified will become apparent hereinafter during the detailed description of an embodiment of the invention which is to follow.

Referring to the accompanying drawings illustrating said embodiment of the invention, Fig. 1 is a front elevational view of the tool holder with a portion thereof broken away and shown in section.

Fig. 2 is a side elevational view of the tool holder taken from the right side of Fig. 1.

Fig. 3 is a bottom plan view of the tool holder.

Fig. 4 is a longitudinal sectional view of the tool holder taken substantially on irregular line 4—4 of Fig. 1 looking in the direction of the arrows, the tool holder being shown secured to the face of a turret (indicated by dash lines) of a machine tool.

Fig. 5 is a fragmentary view similar to Fig. 4 but showing the slide in its uppermost position and reversed in position on its guideway from the showing of Fig. 4.

Fig. 6 is a transverse sectional view taken substantially on irregular line 6—6 of Fig. 1 looking in the direction of the arrows, and Fig. 7 is a transverse sectional view taken substantially on line 7—7 of Fig. 1 looking in the direction of the arrows.

The tool holder comprises a body, preferably formed of an integral casting and having a portion 10 provided on its rear face with a pilot 11 which extends into the opening in the face of a turret of a machine tool or some other support to which the tool holder is to be secured. Reference to Fig. 4 will show the pilot 11 extending into the opening in a turret 12, a portion of which is indicated by dash lines, it also being noted that suitable screws 13 carried by the turret extend into threaded openings in the portion 10 of the tool holder and secure the latter to the face of the turret.

Forwardly of the portion 10 the body of the tool holder includes a portion 14 and an opening 15 extends through the portions 14 and 10 and is axially aligned with the pilot 11 and the opening in the turret face. Various tools may be mounted in the opening 15 and securely held in position therein by clamping screws 16 that can be positioned in threaded openings 17, either at the side or bottom of the portion 14. The opening 15 is also provided with a keyway to receive keys on the tools and hold the latter against turning movement in the opening.

The body of the tool holder extends upwardly from the portions 10 and 14 to provide a portion 18 that has slidably or adjustably mounted thereon a tool carrying slide 19. The portion 18, in this instance, is angularly disposed to the vertical center line of the body which enables the upwardly extending portion 20 of the body to be provided at its upper end with an enlargement having an opening 21 therein through which a pilot bar may extend, but said bar has not been illustrated as it forms no part of the present invention. It will also be noted that the enlarged upper end of the portion 20 is provided with suitable openings through which may extend means for securing a part of the pilot bar mechanism in the opening.

The portion 20 of the body below the pilot bar opening is provided with a tool receiving opening 22 in which a tool holder for a cutting tool can be mounted and securely clamped in position by means of clamping members 23 which are slidably mounted in a recess 24 formed in the body and extending transversely to the longitudinal center line of the opening 22.

The inner clamping member 23 has threaded engagement with a clamping bolt 25, while the outer clamping member 23 is free to move on the bolt 25. The clamping members 23 have their lower adjacent corners formed on a radius, as indicated at 26, and these corners will contact with the shank of a tool holder mounted in the opening 22 when the clamping members are moved toward each other by the rotation of the clamping bolt 25. The clamping members when thus brought into engagement with a shank of a tool holder exert a wedging action on the shank and have a relatively large surface engagement therewith, thus adequately and rigidly clamping the shank in the opening and giving steadiness and stability to the tool holder.

In order to prevent the clamping members and bolt 25 from slipping out of the recess 24 when the shank of the tool holder is removed from the opening 22, a pin or screw or other suitable member 27 is secured in the body so that a portion of its circumference extends into the recess 24, wherefore the inner clamping member 23 is limited by the pin or screw in its outward movement and thus the clamping members and the bolt cannot slip out of the recess.

The portion 18 of the body is provided with a longitudinally extending guideway for the slide 19, and this guideway, in this instance, is in the form of a T-slot 28, see Figs. 6 and 7. The portion 18 of the body for a part of the length of the T-slot 28 has a longitudinally extending opening 29 formed therein through which the bottom of the slide 19 is accessible, as indicated in Figs. 4 and 5.

The slide 19 is provided with a T-portion 30 mounted in the T-slot 28 of the body, as clearly indicated in Figs. 6 and 7, it being noted that the inwardly extending portions of the slot 28 have guiding contact with the T-portion 30 of the slide. The slide 19 outwardly of the T-portion 30 is provided with longitudinally extending shoulders 31 overhanging the outer face of the portion 18 of the body and the inner sides of these shoulders are tapered as clearly indicated in Figs. 6 and 7.

Located intermediate the tapered or inclined surfaces of the shoulders 31 and the outer face of the portion 18 of the body and on each side of the slide are longitudinally extending tapered or wedge-shaped gibs 32. A pair of adjusting or clamping bolts 33 extend transversely through openings in the slide 19 and are threadedly connected at one end with one of the gibs 32, while their opposite or head ends extend freely through the other gib 32, it being noted that said last named gib is provided with recesses for housing springs 34 which act on the heads of the bolts 33 and maintain the bolts and gibs under spring tension.

It will be seen that when the bolts 33 are turned in the proper direction the tapered gibs 32 move toward each other and cooperate with the tapered shoulders 31 of the slide and the face of the portion 18 of the body to wedge or draw the T-portion 30 of the slide into tight clamping engagement with the inwardly extending portions of the T-slot in the body. When the bolts 33 are slightly rotated in the opposite direction the gibs 32 will be urged inwardly by the spring 34 and will form part of the guideway for the adjusting movement of the slide on the portion 18 of the body. The gibs 32 are of the same length as the slide and move with the latter during its adjusting movement, it being noted by reference to Fig. 7 that the slide is provided with pins 35 which extend with a close fit into recesses 36 formed in the gibs 32.

The slide 19 is provided at both ends with threaded openings 37 which receive the reduced threaded end of an adjusting screw 38. The reduced threaded end of the screw 38 is of such length that it can be screwed into the openings 37 and locked therein by a lock nut 39 mounted on said reduced threaded end, as clearly shown in Fig. 4.

The upper end of the screw 38 extends into a threaded sleeve 40 provided at its lower end with a shoulder 41 which abuts with a shoulder formed in a recess 42 of a bracket 43 that is secured to the upper end of the portion 18 of the body by means of screws such as shown at 44 in Fig. 4. A collar 45 is mounted on the sleeve 40 outwardly of the bracket 43 and said collar is keyed to the sleeve for rotation therewith. Outwardly of the collar 45 a lock ring 46 is mounted on an externally threaded end of the sleeve 40 and said lock ring may be locked in position by a set screw 47 or by other suitable means.

It will be noted that the collar 45 and the shoulder 41 on the sleeve 40 constitute a circular groove surrounding the bracket, wherefore the sleeve 40 will be free to rotate but is held against endwise movement. A hollow cap 48 is mounted on the externally threaded end of the sleeve 40 beyond the locking ring 46 and houses the upper end of the screw when the slide 19 is in its most upward position and also acts to prevent dirt or foreign matter from entering into the threaded sleeve. The collar 45 is provided with suitable hand levers, as indicated at 49 in Figs. 1 and 2 for rotating the collar and, in turn, the threaded sleeve 40 to cause an endwise movement of the non-rotatable screw 38 in the sleeve 40 and in turn an endwise movement of the slide 19 along the portion 18 of the body.

The collar 45 is provided with an external annular groove in which is mounted an adjustable ring dial 50 bearing suitable graduations and indicia and which can be locked in adjusted position by a set screw 51. The function of this ring dial will later be referred to.

The slide 19 is provided with an opening 52 for receiving the shank of a tool holder. At one side of the opening 52 there is a second opening through the slide that has a portion of its circumference merging into a portion of the circumference of the opening 52. This second opening is provided with angularly disposed surfaces 53 adjacent its opposite ends and tapered clamping members 54 are mounted in said second opening and have inclined surfaces which cooperate with the angularly disposed surfaces 53 of said opening. A clamping bolt 55 extends through the members 54 and is threadedly connected to one of said members, it being noted that the other member 54 engages against the shouldered head of the bolt.

Inasmuch as the said second opening in the slide 19 is circular in shape and has the angularly disposed surface portions 53, it will be seen that the clamping members 54 and bolt 55 cannot slide out of the second opening when the shank of the tool holder is removed from the opening 52.

It will also be seen that when the bolt 55 is turned in the proper direction and with the shank of the tool holder in position in the opening 52 the clamping members 54 will be drawn toward each other and will act as wedges to force the shank into tight engagement with the surface of the slide within the opening 52. This arrangement enables the shank of the tool holder to be rigidly clamped in position in the opening 52 in the slide and since the clamping members 54 are moved toward each other with an equalized movement, the clamping of the shank in the opening will not cause any shifting movement of the tool carried by the tool holder.

It will also be noted that the portions of the clamping members 54 which contact with the shank of the tool holder are substantially coextensive with the length of the opening and, therefore, the shank of the tool holder will be held rigidly against any tendency to rock in the opening.

The T-portion 30 of the slide 19 can be removed from the T-slot 28 in the portion 18 of the body by removing the bracket 43, and the slide can then be reversibly positioned upon the portion 18 of the body after the screw 38 has been disconnected from the slide, that is, the slide can be reversed from the position shown in Fig. 4 to that shown in Fig. 5 and this reversal of the slide enables the tool opening 52 to be positioned relative to the central opening 15 in a great number of different adjusted positions.

It will be understood that the tool opening 52 when the slide is in the position shown in Fig. 5 can be located at a greater distance from the central opening 15 than it can when the slide is in the position shown in Fig. 4. It will also be noted that the threaded openings 37 are at both ends of the slide and hence when the slide is reversed in position the screw 38 can be connected and locked to the opposite end of the slide from that end to which it had been previously connected.

A scale 56 is secured on the portion 18 of the body at one side of the slide 19 and this scale is provided with graduations and suitable indicia representing the extent of the adjustment movements of the slide, and in this instance such graduations would preferably correspond to the larger increments of movement of the slide as, for example, to inches or centimeters.

An adjustable pointer 57 is mounted on the outer side of one of the gibs 32 and this pointer is provided with an inturned heel portion 58 that slidably fits a groove in the gib and holds the pointer against tilting movement. A thumb screw 59 extends through an elongated slot 60 in the adjustable pointer 57 and is threaded into a threaded opening in the gib 32, it being noted that a recess is provided in the gib and a spring located therein and surrounding the thumb screw 59 maintains the adjustable pointer in adjusted position under spring tension.

As illustrated herein, only one of the gibs is provided with the adjustable pointer, and it will be understood that when the slide has its position reversed this gib will be removed and then positioned on the side of the slide adjacent to the scale 56. Of course, if desired both gibs could be machined to receive the adjustable pointer and then when the slide was reversed, the pointer could merely be changed from one gib to the other.

Assuming that a cutting tool has been mounted in a tool holder and the shank of the holder is secured in the opening 52 of the slide 19 and that the main tool holder illustrated herein has been mounted on the face of a turret of a machine tool, the operator will first turn the collar 45 by means of the handles 49 to bring the cutting tool to its first cutting position. The pointer line of the adjustable pointer 57 is then brought into alignment with a graduation on the scale 56 representing the location of the tool, and then the operator releases the set screw 51 and rotates the ring dial 50 to bring the zero graduation on the ring into line with the fixed pointer line carried by the bracket 43, after which the operator having now determined the location of the cutting tool will then be able to move the cutting tool away from the work to relieve the same or for purposes of loading or unloading, and then can restore the tool to the correct position for machining a second work piece by observing the scale and pointer. In the same way if more than one cutting position is to be given to the tool the operator can determine each of such positions and then subsequently he can readily place the cutting tool in such positions.

It will be noted that the tool holder of the present invention can have attached thereto in the center opening 15 a tool such as a boring bar, drill, reamer or other similar tool and can also have attached thereto in the opening 22 a cutting tool for various purposes, such as for facing, turning, chamfering or undercutting. In addition, a tool holder provided with a cutting tool can be mounted in the adjustable slide 19 and used for either facing or turning at varying diameters, inasmuch as it is carried by an adjustable or movable slide. Furthermore, it will be noted that the tool holder is provided with a portion for receiving part of a pilot bar mechanism, and this will impart to the tool holder greater stability.

It will be understood that when the tool mounted in the tool holder which has its shank clamped in the opening 52, is used for facing, then the slide may be given a feeding movement by rotating the collar 45 by means of the hand levers 49, and such facing cuts can be terminated in a shoulder the diameter of which can be accurately determined by means of the dial ring 50. In addition the cutting tool carried by the slide 19 when used for turning can be adjusted to different radial distances with respect to the work as previously described and accurately positioned at the desired distances by means of the graduated dial ring, scale and adjustable pointer, wherefore diameters on the work can be machined with close tolerances.

It will also be remembered that the operator will be able to restore the cutting tool to these different desired positions as desired by means of the micrometer readings on the dial ring, together with the indications on the scale 56.

It will be remembered that the present tool holder embodies improved means for clamping tools or a tool holder thereon with a wedging action, wherefore said tools or holders will have stability and steadiness and the entire body of the present tool holder is of such character that it has great ruggedness and strength.

Although a preferred embodiment of the invention has been illustrated and described herein, it will be understood that the invention is susceptible of various modifications and adaptations within the scope of the appended claims.

Having thus described my invention I claim:

1. A tool holder comprising a body provided with surfaces forming a portion of a guideway for a slide, a slide having a portion contacting said surfaces, and wedge-shaped gibs on opposite sides of said slide and interposed between said slide and said body and forming with said slide the remaining portion of the guideway therefor, said gibs being carried by the slide and being movable relative thereto.

2. A tool holder comprising a body having surfaces forming part of a guideway for a slide, a slide having a portion engaging said surfaces, gibs located on opposite sides of said slide and interposed between the slide and said body and forming with said slide the remainder of the guideway therefor, said gibs and said slide having cooperating inclined surfaces, and means for drawing said gibs toward each other to wedge said portion of said slide into tight clamping engagement with said surfaces of the body.

3. A tool holder comprising a body provided with surfaces forming a part of a guideway for a slide, a slide having a portion provided with surfaces cooperating with the surfaces of the body, certain of said cooperating surfaces holding the slide against transverse shifting movement but allowing a longitudinal movement thereof, wedge-shaped gibs interposed between said slide and body on opposite sides of the former and constituting therewith the remainder of said guideway, and a single means for drawing said gibs together to wedge the remainder of said cooperating surfaces into tight clamping engagement to prevent longitudinal movement of the slide.

4. A tool holder comprising a body provided with surfaces forming a part of a guideway for a slide, a slide having a portion provided with surfaces cooperating with the surfaces of the body, certain of said cooperating surfaces holding the slide against transverse shifting movement but allowing a longitudinal movement thereof, wedge-shaped gibs interposed between said slide and body on opposite sides of the former and constituting therewith the remainder of said guideway, and resilient means for adjusting said gibs to prevent endwise tilting movement of the slide but allowing longitudinal movement thereof.

5. A tool holder comprising a body provided with an elongated T-slot, a slide having a T-portion cooperating with said slot, gibs arranged on opposite sides of said slide and interposed between the same and the face of said body and forming with said slide and said slot a guideway for the slide, and means for drawing said gibs together for wedging said T-portion into clamping engagement with portions of the body defining at least a part of said T-slot.

6. A tool holder comprising a body provided with an elongated T-slot, a slide having a T-portion cooperating with said slot, gibs arranged on opposite sides of said slide and interposed between the same and the face of said body and forming with said slide and said slot a guideway for the slide, said slide and gibs having cooperating inclined surfaces, and a single means for moving said gibs toward each other to cause said surfaces to have wedging engagement to tightly clamp said T-portion of the slide in said slot.

7. A tool holder comprising a body provided with an elongated T-slot, a slide having a T-portion cooperating with said slot, gibs arranged on opposite sides of said slide and interposed between the same and the face of said body and forming with said slide and said slot a guideway for the slide, said slide and the gibs having cooperating inclined surfaces, means for moving said gibs toward each other to cause said surfaces to have wedging engagement to tightly clamp said T-portion of the slide in said slot, and spring tension means effective when said first named means moves said gibs away from each other to maintain the same in effective guiding position.

8. A tool holder comprising a body, a slide mounted thereon, wedge-shaped gibs arranged on opposite sides of said body, means associated with said gibs for causing the same to perform their usual function or to wedge said slide into clamping engagement with said body, said slide being provided with an opening for receiving a tool or tool holder, wedge-shaped members carried by said slide and forming a portion of the wall of said opening and substantially coextensive with its longitudinal length, and means for moving said wedge-shaped members toward each other to wedge or clamp said tool or tool holder in said opening.

9. A tool holder comprising a body, a slide mounted thereon, wedge-shaped gibs arranged on opposite sides of said body, means associated with said gibs for causing the same to perform their usual function or to wedge said slide into clamping engagement with said body, said slide being provided with an opening for receiving a tool or tool holder, wedge-shaped members carried by said slide and forming a part of the wall of said opening and located at the opposite ends thereof, and means for moving said wedge-shaped members with an equalized movement to wedge or clamp said tool or tool holder in said opening.

10. A tool holder comprising a body provided with a guideway for a slide, a symmetrical slide mounted in said guideway and having a tool or tool holder receiving opening located on one side of its transverse center line, means associated with said body for moving said slide and including a member to be operatively connected to said slide, said slide being provided at opposite ends with means for connecting said member thereto wherefore said slide can be reversibly positioned in said guideway.

11. A tool holder comprising a body provided with a portion having a guideway for a slide and with portions displaced from said first named portion and provided with openings for receiving a tool or tool holder and with an opening for receiving a part of a pilot bar mechanism, and a slide mounted in said guideway and provided with an opening for receiving a tool or tool holder.

12. A tool holder comprising a body having an attaching portion provided with a pilot and a portion provided with a tool or tool holder receiving opening aligned with said pilot, said body also having a portion angularly disposed with respect to said last named portion and provided with a guide and another portion displaced therefrom and provided with an opening for a tool or tool holder, said last named portion of the body being provided with a recess extending transversely to the axis of said last named opening and merging with the circumference thereof, wedge-shaped members mounted in said recess and having portions conforming to the circumference of said last named opening, and means for drawing said wedge-shaped members toward each other to wedge and clamp a tool or tool holder in said last named opening.

13. A tool holder comprising a body, a member movably supported on said body and adapted to receive a tool or tool holder, cooperating screw and nut members for moving said member relative to said body, cooperating indicating means carried respectively by said body and said member for indicating the approximate location of said member on said body, and cooperating indicating means carried respectively by said body and one of said screw and nut members for definitely locating the position of said member on said body.

14. A tool holder comprising a body, a member movably supported on said body and adapted to receive a tool or tool holder, cooperating screw and nut members for moving said member relative to said body, a pair of cooperating indicating elements carried respectively by said body and said member for indicating the approximate location of said member on said body, and a second pair of cooperating indicating elements carried respectively by said body and one of said screw and nut members for definitely indicating the position of said member on said body, one element of each of said pairs of cooperating indicating elements being adjustable relative to the part on which it is carried.

NICHOLAS P. DARASH.